(12) United States Patent
Lyren

(10) Patent No.: US 11,776,169 B2
(45) Date of Patent: *Oct. 3, 2023

(54) WEAPON TARGETING SYSTEM

(71) Applicant: Philip Lyren, Bangkok (TH)

(72) Inventor: Philip Lyren, Bangkok (TH)

( * ) Notice: Subject to any disclaimer, the term of this patent is extended or adjusted under 35 U.S.C. 154(b) by 0 days.

This patent is subject to a terminal disclaimer.

(21) Appl. No.: 17/238,239

(22) Filed: Apr. 23, 2021

(65) Prior Publication Data

US 2022/0067985 A1 Mar. 3, 2022

Related U.S. Application Data

(63) Continuation of application No. 16/662,070, filed on Oct. 24, 2019, now Pat. No. 10,991,131, which is a continuation of application No. 16/558,081, filed on Aug. 31, 2019, now Pat. No. 10,846,890, which is a continuation of application No. 15/973,368, filed on May 7, 2018, now Pat. No. 10,410,378, which is a continuation of application No. 14/823,510, filed on Aug. 11, 2015, now abandoned.

(60) Provisional application No. 62/046,904, filed on Sep. 6, 2014.

(51) Int. Cl.
| | | |
|---|---|---|
| *G06T 11/00* | (2006.01) | |
| *G06T 11/60* | (2006.01) | |
| *G02B 27/01* | (2006.01) | |
| *G09B 19/00* | (2006.01) | |
| *F41G 1/35* | (2006.01) | |
| *F41G 3/06* | (2006.01) | |
| *F41G 3/08* | (2006.01) | |
| *F41G 1/46* | (2006.01) | |
| *F41G 3/12* | (2006.01) | |
| *F41G 1/467* | (2006.01) | |
| *F41G 1/473* | (2006.01) | |

(52) U.S. Cl.
CPC .............. *G06T 11/001* (2013.01); *F41G 1/35* (2013.01); *F41G 1/467* (2013.01); *F41G 1/473* (2013.01); *F41G 3/06* (2013.01); *F41G 3/08* (2013.01); *F41G 3/12* (2013.01); *G02B 27/017* (2013.01); *G06T 11/60* (2013.01); *G09B 19/0038* (2013.01); *G02B 2027/0178* (2013.01)

(58) Field of Classification Search
CPC ... G06T 11/001; G06T 11/60; G09B 19/0038; G02B 2027/0178; G02B 27/017; F41G 1/35; F41G 1/467; F41G 1/473; F41G 3/06; F41G 3/08; F41G 3/12
See application file for complete search history.

(56) References Cited

U.S. PATENT DOCUMENTS

| | | | | |
|---|---|---|---|---|
| 8,678,282 | B1 * | 3/2014 | Black et al. ............ | G06F 3/012 235/407 |
| 2009/0040308 | A1 * | 2/2009 | Temovskiy ............... | F41G 3/16 382/296 |
| 2012/0127284 | A1 * | 5/2012 | Bar-Zeev ............... | G06T 19/006 348/158 |
| 2013/0169820 | A1 * | 7/2013 | Stewart ................. | F41G 3/2605 348/169 |

(Continued)

*Primary Examiner* — Wesner Sajous

(57) ABSTRACT

A wearable electronic device displays an impact location that shows where a projectile fired from a weapon will hit a target and displays a bullseye location that shows a desired location where to hit the target. The wearable electronic device indicates firing the weapon when the impact location overlaps with the bullseye location.

19 Claims, 9 Drawing Sheets

(56) References Cited

U.S. PATENT DOCUMENTS

2016/0069643 A1\* 3/2016 Lyren ................. G06T 11/60
345/589

\* cited by examiner

WEAPON TARGETING SYSTEM

BACKGROUND

Bows and arrows, guns, and other handheld weapons often include a targeting device that assists a shooter in aiming the weapon. For example, some weapons include a scope or a sight to help the shooter aim the weapon in order to hit an intended target.

Advancements in weapon targeting devices and systems will further assist shooters in aiming weapons and hitting intended targets.

SUMMARY OF THE INVENTION

One example embodiment is a weapon targeting system.

Another example embodiment includes an electronic device and a weapon that communicate with each other to target and/or fire on an object.

Another example embodiment includes a wearable electronic device that displays an impact location that shows where a projectile fired from a weapon will hit a target and displays a bullseye location that shows a desired location where to hit the target. The wearable electronic device indicates firing the weapon when the impact location overlaps with the bullseye location.

DETAILED DESCRIPTION

Example embodiments include systems, apparatus, and methods that include weapons, electronic devices, and a weapon targeting system.

Figure 1:
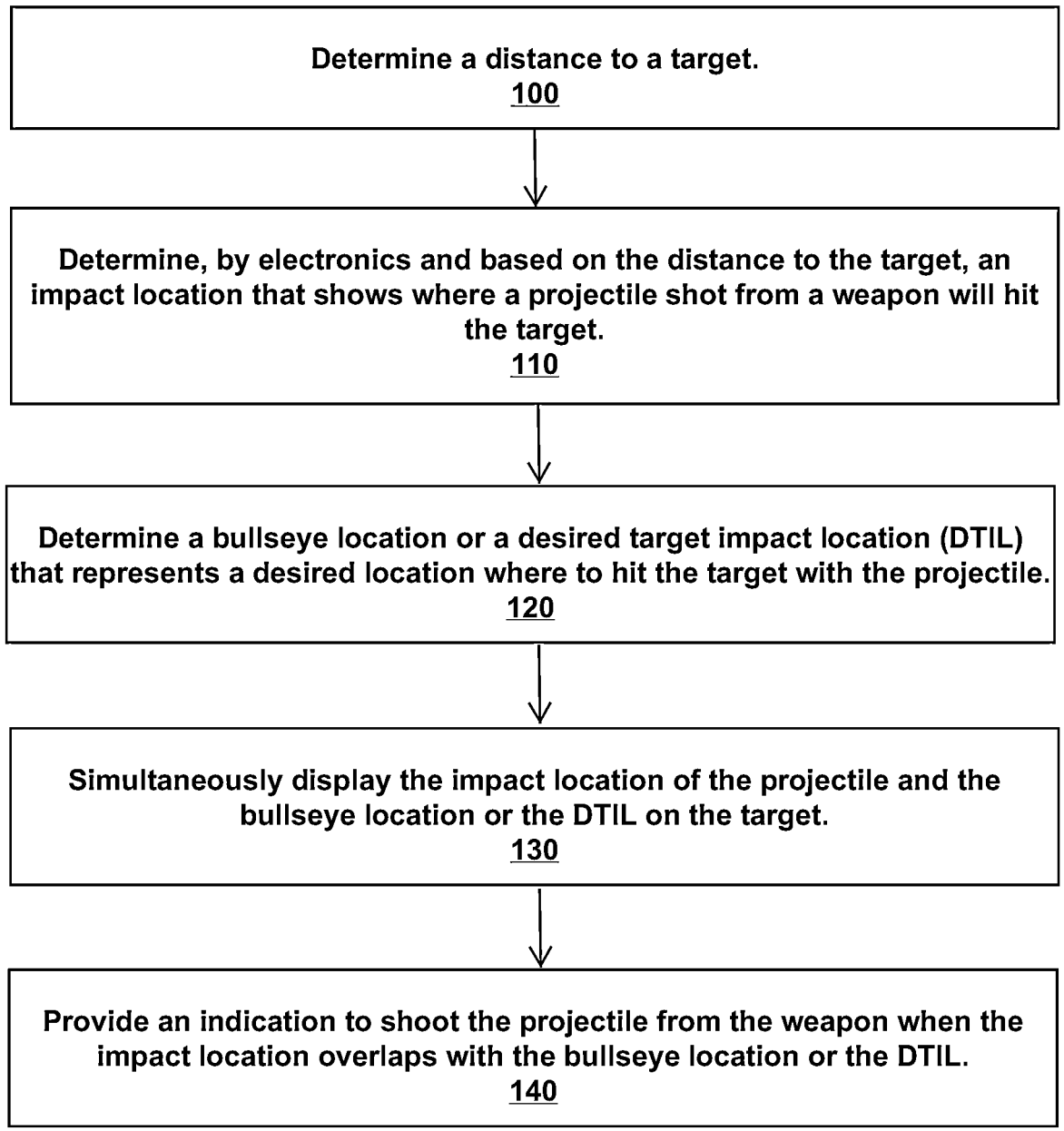
FIG. 1 is a method to provide an indication to shoot a weapon when an impact location of a projectile overlaps with a bullseye location in accordance with an example embodiment.

FIG. 1 is a method to provide an indication to shoot a weapon when an impact location of a projectile overlaps with a bullseye location.

Block 100 states determine a distance to a target.

An electronic or mechanical device measures a distance from a weapon or a projectile to the target and provides this distance to a shooter. For example, a laser rangefinder determines a distance to the target. As another example, a mil dot scope or milliradian scope provides information to determine a distance to a target. As another example, global positioning satellite (GPS) coordinates or satellite position information provides a distance to a target. As yet another example, a camera determines a distance to the target. As yet another example, a user provides or inputs a distance to a target.

The electronic or mechanical device can be a separate device (such as a standalone device) or device integrated with or attached to the weapon, the projectile, or another electronic device. For example, electronic and/or mechanical devices in a bow or a gun determine a distance to a target. As another example, electronic and/or mechanical devices in one or more of a wearable electronic device (WED), handheld portable electronic device (HPED), computer, server, and a satellite determine a distance to the target.

Block 110 states determine, by electronics and based on the distance to the target, an impact location that shows where a projectile shot from a weapon will hit the target.

The impact location is where the projectile will actually hit or impact the target and is calculated using one or more of a velocity of the projectile fired from the weapon, a mass of the projectile, a drag coefficient of the projectile, an inclination angle of an aiming direction of the projectile and/or weapon with respect to an axis parallel to ground, and ambient or environmental conditions. Electronics located on or in the weapon or in communication with the weapon calculate and determine the impact location. By way of example, a processor located in or on a bow or gun determines an impact location of an arrow (for a bow) or a bullet (for a gun). As another example, a wearable electronic device (WED) and/or computer in communication with the WED calculates and determines the impact location and provides this information to the weapon, another electronic device, and/or to the user.

Block 120 states determine a bullseye location or a desired target impact location (DTIL) that represents a desired location where to hit the target with the projectile.

Electronics located on or in the weapon or in communication with the weapon calculate and determine the bullseye location or DTIL. Alternatively, a user determines this location. By way of example, a processor located in or on a bow or gun determines a bullseye location or the DTIL on a target. As another example, a wearable electronic device (WED) and/or computer in communication with the WED calculates and determines the bullseye location or the DTIL and provides this information to the weapon and/or to the user.

The DTIL or bullseye location can be determined manually or automatically. For example, an electronic device determines the DTIL or the bullseye location on an animal to be a location that the projectile will hit and kill the animal. As another example, a software application determines that a center of an object at which a weapon is being aimed is the DTIL or the bullseye location. As yet another example, a shooter determines that the DTIL or the bullseye location is a location on an animal that will wound but not kill the animal. As yet another example, a weapon receives a determination that a bullseye location on an automobile is a front tire or is a location to disable the automobile upon impact of a projectile fired from the weapon.

Block 130 states simultaneously display the impact location of the projectile and the bullseye location or the DTIL on the target.

The impact location and the bullseye location or the DTIL can be displayed on various electronic devices. For example, wearable electronic glasses (WEG), a wearable electronic device (WED), and/or a handheld portable electronic device (HPED) in communication with the weapon simultaneously display the impact location of the projectile and the bullseye location or the DTIL on the target. As another example, an electronic scope or a sight mounted to or in communication with the weapon displays these locations.

Block 140 states provide an indication to shoot the projectile from the weapon when the impact location overlaps with the bullseye location or the DTIL.

The indication to shoot includes one or more of a visual indication (such as visible indicia on a display of an electronic device) and an audible indication (such as a sound originating from an electronic device). By way of example, a pair of WEGs, a WED, an electronic scope, or a HPED displays a visual indication to shoot an arrow from a bow or a bullet from a gun when the impact location displayed on the WEG, WED, electronic scope, or HPED overlaps, coincides, touches, or aligns with the bullseye location or DTIL also displayed on the WEG, WED, electronic scope, or HPED.

Consider an example of a weapon targeting system that includes a gun with electronics that communicate with WEGs that a shooter of the gun wears. The shooter points the gun toward a target. The gun captures and/or records images or video of the target, and the gun determines that the target is two hundred meters (200 meters) from the gun. Based on this distance, the weapon targeting system calculates an impact location that is displayed on the WEG. This impact location shows in real-time where a bullet fired from the gun will impact the target. The weapon targeting system uses object recognition software to recognize the target as a deer, determines a bullseye location above a front shoulder of the deer, and displays visible indicia on the WEG to show the bullseye location. The visible indicia appears on the display of the WEG at a location that corresponds to the front shoulder of the deer. The impact location displayed on the WEG moves in real-time and in synchronization with movement of the gun such that the impact location follows or tracks where the gun is pointed and where the bullet will strike the target or another object (e.g., if the gun is not pointed to hit the target). At the same time, the bullseye location remains fixed or positioned on the front shoulder of the deer even as the deer moves. When the impact location displayed on the WEG moves onto or over the bullseye location also displayed on the WEG, the weapon targeting system generates a beeping sound that the shooter hears in his or her ear from the WEG. A color of the bullseye also changes color or brightness when the impact location moves onto or over the bullseye location to provide a visual indication to the shooter to fire or shoot the gun.

The weapon targeting system determines an impact location of the projectile based on one or more of a velocity of the projectile from the weapon, a mass of the projectile, a drag coefficient of the projectile, an inclination angle of an aiming direction of the weapon with respect to an axis parallel to ground, and environmental or ambient conditions.

Gravity, drag (or air resistance), and wind are three external forces that alter or affect the trajectory or flight path of the projectile. Gravity forces the projectile to drop from the line of sight. Drag slows down or decelerates the projectile with a force proportional to the square of its velocity, and wind changes or alters the trajectory or flight path of the projectile from the line of sight.

By way of example, the weapon targeting system determines a ballistic trajectory for the projectile being fired from the weapon and provides this ballistic trajectory to a weapon and/or an electronic device. An imaginary line down the center of an axis of a bore of a gun or along a length of an arrow positioned in a bow is a line of departure. The line of departure coincides with the line of sight when the shooter aims the weapon along the line of departure. As the bullet or arrow travels toward the target, gravity pulls downwardly and deflects the bullet or arrow from the line of departure. This vertical drop for a bullet is called bullet drop and for an arrow is called arrow drop. The bullet drop and the arrow drop are used in ballistic computations to determine the impact location of the projectile on the target.

The weapon targeting system calculates the projectile drop (e.g., the bullet drop or the arrow drop). A distance (df) an object falls due to gravity is a function of time of flight (t), acceleration due to gravity (g), and initial velocity (v). The following equation provides this distance (assuming no air resistance):

$$df = vt + (½)gt^2.$$

Consider an example in which an arrow is shot perpendicular to the pull of gravity (e.g., parallel with the ground) with an initial horizontal velocity of 300 feet per second (fps). Assuming no air resistance and a flight time of one second, the arrow will travel 300 horizontal feet and about 16.1 vertical feet (df=0×t+(½)×32.2 feet/second^2×1 second^2=16.1 feet). If the intended target were 300 feet from the shooter on a level surface and the shooter shot the arrow level with the ground from a height of 5 feet, then the arrow would impact the ground after a time of about 0.56 seconds and a distance of about 167 feet (i.e., the arrow would hit the ground about 132 feet short of the target).

If the impact location were placed directly along the line of sight of the weapon, then the projectile would not hit the target at the impact location but would hit the target below the impact location since gravity would pull the projectile and alter its path along the line of sight. In order to compensate for bullet drop or arrow drop, the impact location is changed from the line of sight or line of departure in order to increase a positive elevation angle from the line of departure (or from the line of sight if these two lines correspond). This change compensates for the vertical drop of the projectile due to gravity. Altering this location causes an increase in elevation of the muzzle of the gun or bow to offset the vertical drop and provides a true or real location where the projectile will impact the target. This true or real location is impact location of a projectile on an object or a target.

The ballistic trajectory of a projectile or a flight path of the projectile is the path that the projectile undertakes with the action of gravity without additional propulsion after launch. For example, the horizontal distance (d) that an object travels when launched from a flat surface is a function of its initial height (h), initial velocity (v), acceleration due to gravity (g), and the angle at which the projectile is launched ($\theta$). The following equation provides this distance:

$$d=(v \cos \theta / g)(v \sin \theta + ((v \sin \theta)^2 + 2gh)^{1/2}).$$

Furthermore, the time of flight (t) for a projectile to complete the trajectory is a function of the distance (d), the angle ($\theta$), the initial velocity (v), and acceleration due to gravity (g). The following equation provides this time:

$$t=d/v \cos \theta = (v \sin \theta + ((v \sin \theta)^2 + 2gh)^{1/2})/g.$$

Further yet, the height (y) of the projectile at a given distance (x) is given by the following equation:

$$y=h+x \tan \theta - (gx^2)/2(v \cos \theta)^2.$$

Thus, the angle at which the projectile should be launched ($\theta$) can be calculated when the distance (d), the initial velocity (v), and the initial height of the projectile (h) are known. For example, when the initial height (h) is zero and the projectile is launched from a flat surface, then the angle the projectile should be launched ($\theta$) to travel a distance (d) is given with the following equation:

$$\theta=(\tfrac{1}{2})\arcsin(dg/v^2).$$

This equation can be expanded for instances in which the angle the projectile should be launched ($\theta$) to hit a target at a distance (x) with a height (y) when fired from a relative X-Y location of (0,0) with respect to the target is given by the following equation:

$$\theta=\arctan(v^2 \pm (v^4-g(gx^2+2yv^2))^{1/2}/gx).$$

This equation can be further modified for instances in which polar coordinates are used instead of X and Y coordinates. In order to hit a target at a distance (d) with an angle of elevation ($\phi$), then the angle the projectile should be launched ($\theta$) is given by the following equation:

$$\theta=\tan^{-1}((v^2 \pm (v^4-g(gd^2 \cos^2\phi + 2v^2 d \sin \phi))^{1/2})/gd \cos \phi).$$

These equations can be further modified to compensate for drag or air resistance that is proportional to the velocity squared of the projectile. Drag depends on the properties of the fluid through which the projectile is moving and also on the size, the shape, and the speed of the projectile. Drag (Fd) is given by the following equation:

$$Fd=(\tfrac{1}{2})pv^2 CdA,$$

where Fd is the drag force, p is the density of the fluid, v is the speed of the projectile relative to the fluid, Cd is the drag coefficient, and A is the orthographic projection of the object or the cross-sectional area. Cd can be measured (for example in a wind tunnel), approximated from known values of Cd of objects with similar size and shape, measured during flight experiments, or determined with software (such as an arrow flight simulator).

Further, the deceleration (Dc) of the projectile is given by the following equation:

$$Dc=(pv^2 CdA)/2m,$$

where m is the mass of the projectile. This equation shows that deceleration of the projectile increases with density of the fluid (p), velocity of the projectile (v), and area (A), and decreases with the mass (m). For example, heavy and slower arrows have less drag deceleration, and larger diameter arrows have more drag deceleration.

The ballistic trajectory of a projectile can be calculated or estimated when the drag coefficient is known. The drag coefficient in turn depends on the shape of the object and on its Reynolds number. The ballistic trajectory of the projectile can also calculated or estimated with the ballistic coefficient. For example, the drag coefficient (Cd) can be calculated from the ballistic coefficient (BC) with the following equation:

$$Cd=(Cg)m/(BC)Di^2,$$

where m is the mass of the projectile, Di is the diameter of the projectile, BC is the ballistic coefficient, and Cg is the drag coefficient of a G1 reference projectile. BC values for projectiles (such as arrows) can be calculated from experiments with various measured form factors.

As noted, the line of departure or line of sight does not provide an accurate location for where the projectile will impact the target since external forces alter the projectile. Deviations from the line of departure occur from drag, gravity, and ambient or environmental conditions. The impact location is calculated to compensate for these deviations that occur during flight time. The impact location shows a user or a shooter a true or accurate location of where the projectile will strike the target. Further, as the shooter moves the weapon from one target to another target or as the target moves (e.g., as the distance to a target changes), the impact location is re-calculated in real-time with movement of the weapon and/or movement of the target.

An elevation angle or angular displacement to a target will also affect a trajectory or path of the projectile. For example, a shape of a trajectory path of a projectile is different depending on whether gravity acts on a perpendicular path or an angled path. Gravity provides a downward acceleration on the projectile, and this downward acceleration causes the projectile to drop from the line of departure.

Projectiles that leave the weapon with a known elevation angle or a known angle of departure follow a determinable or calculatable ballistic trajectory. This ballistic trajectory, flight path, or trajectory path is dependent on velocity, gravity, drag, and other ambient or environmental conditions. For instance, when the projectile leaves the weapon with a positive elevation angle with respect to ground, the projectile has both forward and vertical motion. Air resistance slows the forward motion, and gravity slows the vertical motion. This projectile initially rises above the line of sight until it reaches an apex point in the trajectory parabola. At this location, the vertical speed becomes zero, and the projectile begins to descend along the trajectory path.

Ballistic trajectories provide information to calculate or determine ballistic tables. Ballistic tables for bullets, arrows, and other projectiles can be used to determine how much elevation correction will be applied to a line of sight or line of departure for shots at various distances given current ambient conditions. This information is stored in memory and retrieved to make adjustments to the impact location.

The speed of the projectile can be obtained, measured, calculated, retrieved, acquired, received, determined, etc. For example, a chronograph or chronometer measures a speed of an arrow from the bow as the arrow passes over two sensors. As another example, projectiles are sold with weight and/or speed information (such as providing consumers with feet per second (fps) of the ammunition for a gun or arrow for a bow). This information can also be retrieved from memory over a network.

Consider an example in which a shooter purchases a crossbow and arrow, and the manufacturer or seller provides the shooter with the following information: 375 feet per second (fps) for a 395 grain arrow.

Ambient or environmental conditions can also affect the projectile. Examples of ambient or environmental conditions include, but are not limited to, wind speed, wind direction, temperature, humidity, Doppler radar measurements, precipitation, and elevation or barometric pressure. Instruments to measure ambient or environmental conditions include, but are not limited to, a thermometer, a barometer, a humidity sensor, a wind vane, an anemometer, a weather map, a compass, a weather satellite, human eyes, etc. Further, real-time information about environmental conditions can be obtained from a database, the Internet, weather stations, etc.

Consider an example in which an electronic device mounted on or included with a weapon communicates with a network and a server to obtain current weather and location information based on a longitude and latitude location of the weapon or a global positioning system (GPS) location. The weapon or weapon targeting system receives information (such as current outdoor temperature, wind speed, wind direction, and altitude) and uses this information to calculate an impact location for a projectile fired from the weapon.

Consider an example in which a shooter provides a weapon or HPED in communication with the weapon with current weather and location information. For instance, the shooter enters sea elevation, outdoor temperature, and wind speed.

Consider an example in which the weapon targeting system calculates how much an arrow will drift from wind with a lateral component. This calculation includes one or more components of initial velocity of the arrow, angle of departure, drag, weight of the arrow, wind speed or wind velocity, wind direction, and flight time. These components can be measured, determined, calculated, and/or retrieved. Drag from the wind causes a nock end of the arrow to push or tail off toward the downwind side. This causes the arrow to be cocked or pointed upwind during flight (from a perspective of a shooter). During flight, the arrow will drift downwind as it travels toward the target. Further, as the arrow travels in flight with a crosswind, the arrow accelerates with a lateral or sideways velocity. The rate of this lateral acceleration depends on the drag characteristics of the arrow and on the weight of the arrow. The weight and drag characteristics of an arrow can be measured or determined. Flight time also affects drift since the longer the arrow remains in flight the more the arrow accelerates in the lateral direction. Flight time depends on distance to target, initial arrow velocity, and rate of deceleration (drag). These components can also be measured, determined, and/or calculated. Thus, the effects of wind on the trajectory path of the arrow can be calculated. Wind drift calculations for different arrows with different ballistic coefficients can be calculated, stored in memory, retrieved, and provided for real-time calculation of a trajectory path and an impact location.

Consider an example in which the weapon targeting system, a weapon, an electronic device, or an HPED communicates with an Internet service, web application, or software application to receive real-time weather information, such as wind speed, wind direction, ambient air density, and other ambient conditions for a specified or determined geographical location. This information is then used to calculate the impact location of the projectile fired from the weapon at this geographical location.

Figure 2:
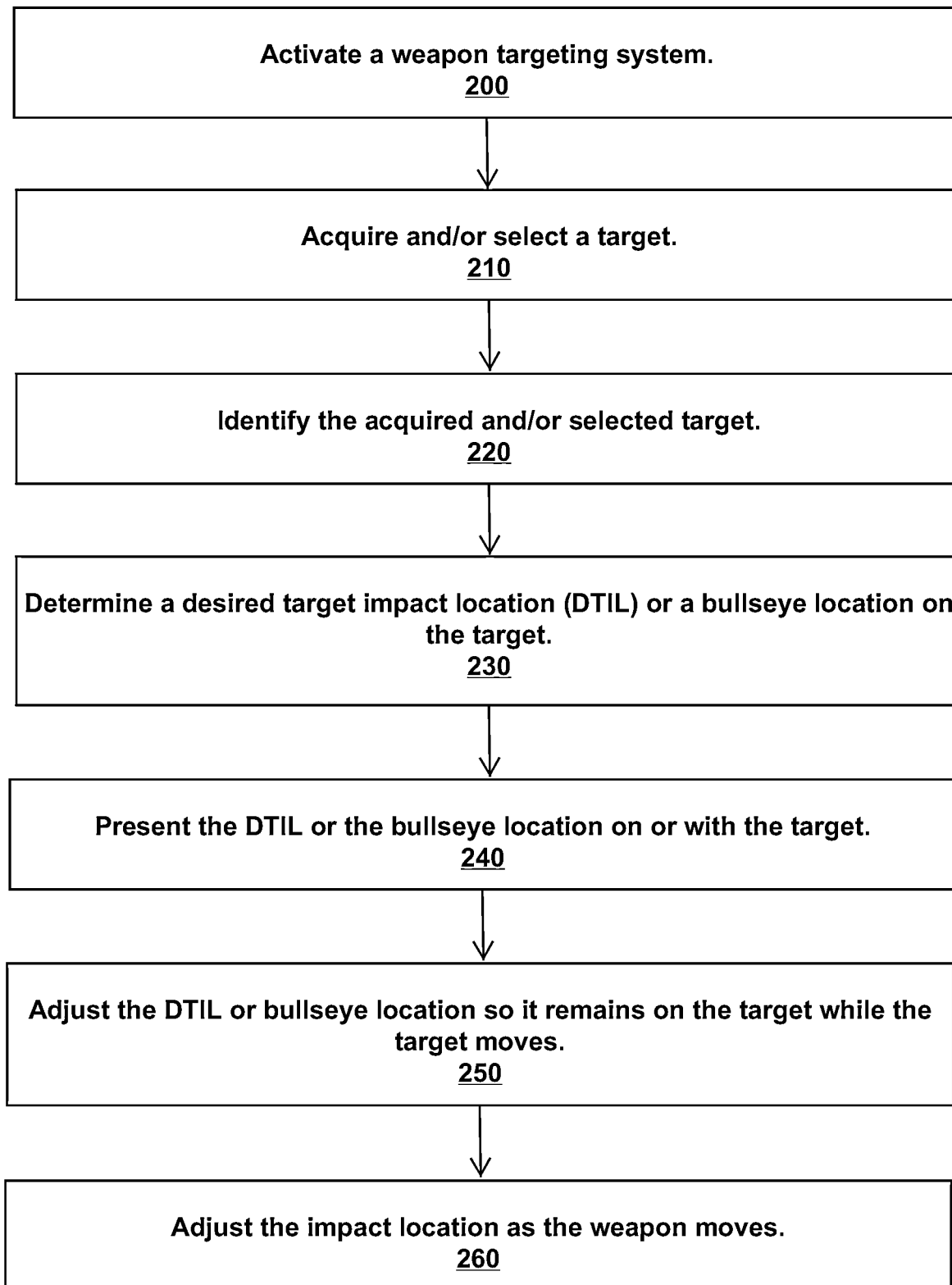
FIG. 2 is a method to present a desired target impact location (DTIL) or a bullseye location on a target in accordance with an example embodiment.

FIG. 2 is a method to present a desired target impact location (DTIL) or a bullseye location on a target.

Block 200 states activate a weapon targeting system.

The weapon targeting system can be activated manually or automatically. For example, a shooter activates the weapon targeting system with a finger, hand, voice, or human effort. For instance, the weapon includes one or more of hardware, software, electronics, a sensor, a switch, a trigger, or a mechanism to turn the weapon targeting system on and off. By way of example, a shooter places his finger or hand at a predetermined location on the weapon to activate the weapon targeting system. As another example, a shooter pulls a string of a bow back with an arrow engaged, and this action activates the weapon targeting system. As yet another example, the weapon targeting system automatically activates at a certain time of day, at a certain geographical location, when the weapon is in a certain physical orientation, when the weapon is gripped, when the weapon determines a presence of a target, when the weapon is aimed at a target, etc. As yet another example, a user interacts with a handheld portable electronic device (HPED), wearable electronic device (WED), or electronic device that communicates with the weapon in order to activate the weapon targeting system.

Consider an example in which a bow and arrow includes or communicates with a weapon targeting system. When the bow aims to a location on the ground that is proximate or near the bow or a user, then the weapon targeting system deactivates. When the bow aims to a location away from the ground or to a target, then the weapon system activates.

Block 210 states acquire and/or select a target.

The target can be acquired and/or selected manually or automatically. For example, a shooter aims the weapon at a target, and this action selects the target. As another example, the shooter selects a target being displayed on a display or being visible through an electronic scope or lens. As another example, a third party (e.g., not the shooter of a weapon) interacts with a HPED to select a target and sends this selection to the shooter and/or weapon. As another example, a computer automatically selects a target for a user.

Consider an example in which the target is transmitted to or provided to the weapon from a remote electronic device, such as a server, a satellite, an HPED, a WED, or another weapon. For instance, a third party or computer receives images that show a field of view of where a weapon is being aimed. These images include multiple different targets and/ or objects. The third party or computer performs object recognition and analysis on the images, selects one of the objects as being the target, and transmits this target to the weapon and/or the shooter.

Consider an example in which the shooter selects the target with the weapon, an HPED, or a WED. For instance, the shooter uses thermal imagery electronics to locate an object in a field-of-view of a pair of electronic glasses and interacts with an interface on the weapon to select this object as the target. For instance, the shooter hits the object with light (such as laser light or infrared light) in order to instruct the weapon that selected object is the target. As another example, the shooter provides verbal instructions to a natural language interface to communicate with the weapon and/or weapon targeting system to select an object as a target that appears on a display.

Consider an example in which a shooter uses voice and/or gesture commands to guide or move a target selector along a display until the target selector is on a desired target.

Block 220 states identify the acquired and/or selected target.

The target can be identified manually or automatically. For example, a shooter states a name of the target (such as stating the target is deer or stating the name of a person or an object). As another example, facial recognition software, animal recognition software, or object recognition software identifies the target. For instance, an image of the target is compared with images stored in a database or memory to determine that the target is a black bear. As another example, facial recognition software identifies a person that is determined to be the target. As yet another example, a GPS location of the target identifies the target. For instance, GPS coordinates of the selected target are referenced with an electronic map to determine that the target is a building, an automobile, a tree, or a target on an archery range.

Consider an example in which an electronic component of the weapon targeting system captures an image of an object and determines this object is a target. An image of this object is compared with images stored in a database to determine a type or identity of the object. For instance, facial recognition software determines an identity of a person, or object recognition software determines the object is a female deer (a doe) or a male deer (a buck). The weapon targeting system determines a bullseye location or a DTIL on the target based on an identity of the object. For instance, the target is identified as an enemy combatant, and the DTIL is placed on a location of the target to wound or injure, but not kill, the target. As another instance, the object is identified as an animal, and the DTIL is placed on a location to kill the particular type of identified animal.

Block 230 states determine a desired target impact location (DTIL) or a bullseye location on the target.

The DTIL or bullseye location can be determined manually or automatically. For example, an electronic device determines the DTIL or bullseye location on an animal to be a location through which the projectile will hit the heart of the animal. As another example, a software application determines that a center of a target is the DTIL or bullseye location. As yet another example, a shooter determines that the DTIL or bullseye location is a location on an animal that will wound but not kill the animal. As yet another example, a weapon receives a determination that a bullseye location on an automobile is a front tire.

Block 240 states present the DTIL or the bullseye location on or with the target.

The DTIL or the bullseye location can be presented on or with the target with an audible indication and/or a visual indication. For example, the DTIL or bullseye location appears as an image on a display, in an electronic scope, on a lens, on the target itself, as a projection, or in an area or space (e.g. space located between the weapon and the target). For instance, a two-dimensional (2D) or three-dimensional (3D) image presents a location for the DTIL or bullseye location. As another instance, a laser spot, infrared spot, or source of electromagnetic radiation appears on the target. As another example, a visual indication appears on a display of a WED or a pair of WEG that a shooter wears while aiming a weapon at the target. The visual indication coincides with a location of a target that is in front of the shooter such that the visual indication appears to the shooter to be located on the target. The visual indication, however, is not actually located on the target but appears on the display of the WED or WEG.

Consider an example in which visual indicia or a visual indication (such as a circle, a dot, reticles, or cross-hairs) appears on a display of an electronic device that communicates with a weapon aimed at a target. This indicia or indication moves with movement of the weapon in order to show in real-time an impact location for a projectile fired from the weapon. In addition to showing the indicia or indication, the display also displays a field of view of the weapon and/or shooter, and this field of view includes a selected physical target that is located several hundred meters away from the electronic device and the shooter. The display of the electronic device displays the indicia or indication such that it appears on, over, or with the selected physical target.

Consider an example in which an electronic tactical weapons scope mounted to a weapon places a dot or image on a target to indicate a DTIL or bullseye location on this target.

Block 250 states adjust the DTIL or bullseye location so it remains on the target while the target moves.

The DTIL or bullseye location tracks and/or follows the target and remains at a consistent location as the target moves. For example, the DTIL or bullseye location simultaneously moves with the target while staying at a fixed location on or over the target.

Consider an example in which a bullseye location displays on a display of wearable electronic glasses and appears on or over a front shoulder of a deer that is visible through the wearable electronic glasses. As the deer moves, this bullseye location moves on the display and remains on the front shoulder of the deer.

Block 260 states adjust the impact location as the weapon moves.

The impact location tracks and/or follows movement of the weapon in real-time such that at any given point in time the impact location shows where the project will strike the target or another object if the weapon is fired at the given point in time. For example, the impact location simultaneously moves with movement of the weapon.

Consider an example in which an impact location displays on a display of wearable electronic glasses and appears on or over a deer as a shooter points a weapon at the deer that is visible through the wearable electronic glasses. As the weapon and/or the deer move, a location of the impact location changes in real-time to correspond with this movement. For example, the weapon targeting system continuously, continually, or periodically calculates the impact location based on a position of the target and/or of the weapon. As another example, the weapon targeting system calculates the impact location in response to detecting movement of the weapon, movement of the target, and/or a change in a factor used in calculating the impact location (e.g., a change in an environment condition, such as wind speed or wind direction).

Figure 3:
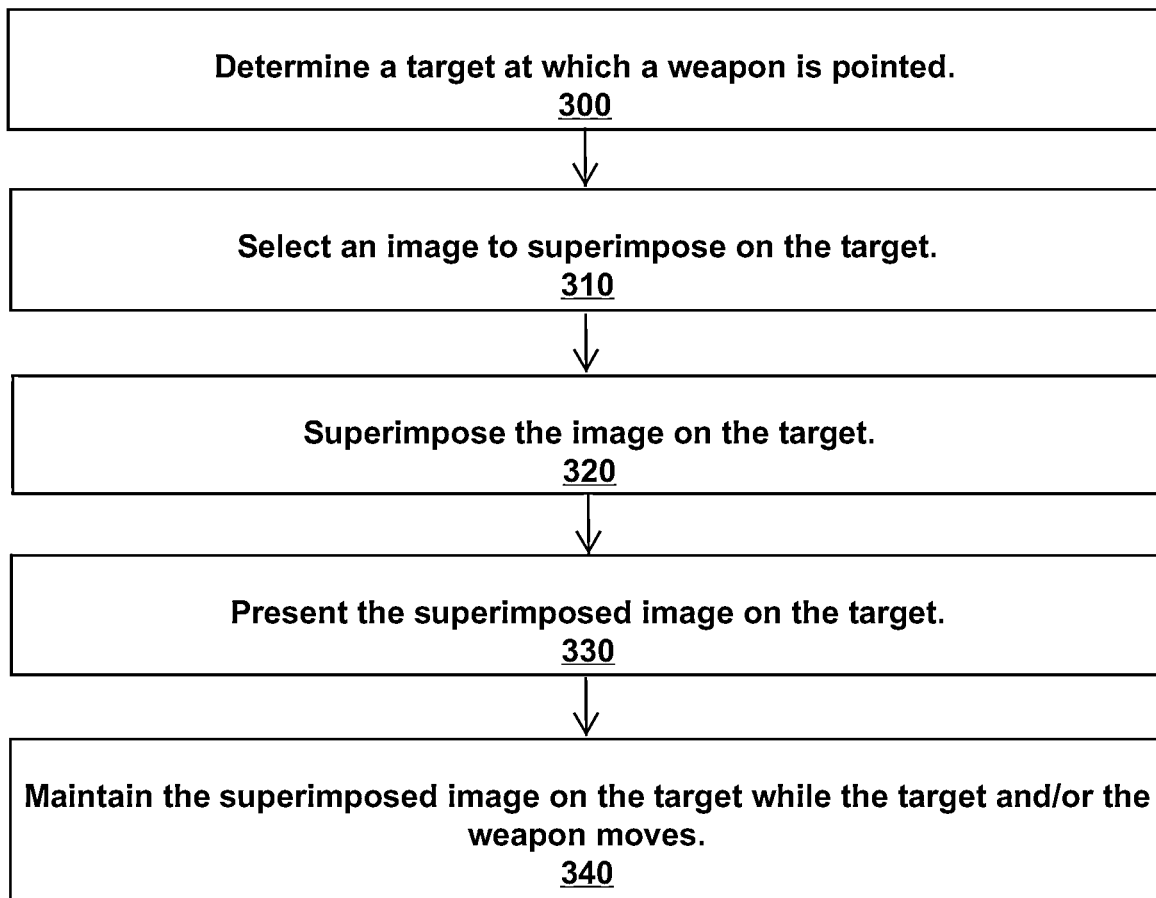
FIG. 3 is a method to superimpose an image on a target in accordance with an example embodiment.

FIG. 3 is a method to superimpose an image on a target.

Block 300 states determine a target at which a weapon is pointed.

A target can be determined manually (e.g., a user identifies a target to a weapon or the weapon system) or determined automatically (e.g., an electronic device alone or in conjunction with a user identifies a target). For example, object or facial recognition software identifies an object from a digital image, a photo, or a video. For instance, a weapon targeting system identifies objects that appear in a scope, in a sight, on a display, on or through an electronic device (such as a camera, pair of WEG, a WED, an HPED, or an electronic device).

Block 310 states select an image to superimpose on the target.

An image can be selected manually (e.g., a user selects an image) or selected automatically (e.g., an electronic device alone or in conjunction with a user selects an image). For example, a user or an electronic device selects one or more images from a library of images, from memory, or generates an image.

Selection of the image can be based on one or more of the following: content of the target, identification of the target, a size of the target, a shape of the target, a geographical location of the target, a speed of the target, a proximity of the target to another object, a danger or threat associated with the target, a random selection, a previous selection, user input, user preferences, a user profile, etc.

Block 320 states superimpose the image on the target.

The image is partially or fully superimposed on, positioned on, positioned over, or overlaid on the target. Further, the image can partially or fully occlude the target, enhance the target, modify the target, brighten the target, make the target more visible, etc.

Block 330 states present the superimposed image on the target.

The superimposed image can be stored in memory, transmitted, and/or provided to a user or to an electronic device. For example, a display of an electronic device displays the image (e.g., displayed on a pair of WEG, a WED, an HPED, a scope, or a computer). The image on the display appears to be on, over, in front of, or behind the target.

Block 340 states maintain the superimposed image on the target while the target and/or the weapon moves.

As the target and/or the weapon moves, the superimposed image simultaneously moves such that the superimposed image remains fixed on the moving target. For example, the superimposed image remains in a constant or fixed position on the target while the weapon moves from shooter jitter and while the target also moves.

Modifications to the displayed target and/or the superimposed image on the target can assist in differentiating or accentuating the target in an environment, tracking movement of the target, recognizing the target, distinguishing the target from its surroundings, aiming at and firing on the target, and identifying the target. For example, the target may be difficult to see due to darkness or low lighting conditions, distance from the weapon, fog, rain, snow, or other environmental conditions.

Modifications to the displayed target and/or the superimposed image on the target include, but are not limited to, highlighting all of the target or a portion of the target, filling all of the target or a portion of the target with a color or light, accentuating a perimeter or boundary of the target with light, color, or an image, placing a photo or an image on or over the target, placing a virtual image or virtual lines on or over the target, placing an object or indicia on or over the target, changing a contrast, a brightness, or a color of the target, accentuating the target to make it more visible, changing or enlarging a size of the target, changing a shape of the target, replacing the target with an image, or changing objects on or near the target to accentuate the target.

Consider an example in which a shooter views a target through an electronic scope that is mounted to a weapon. The target is several hundred feet from the shooter. A view of the target through the scope is partially obscured with foliage, and the target is difficult to see due to poor visibility. The weapon targeting system recognizes the target as a deer and provides an image of a red outline around the physical boundary or body of the deer. This red outline appears in the electronic scope, accentuates the deer and its location, and makes the deer more easily viewed through the scope.

Consider an example in which a shooter aims a gun toward a group of people.

The gun includes a camera and electronics that communicate with wearable electronic glasses that the shooter wears. The glasses have a display that displays images or video in real time from the camera such that the shooter can see where the gun is aimed on the display of the glasses. Facial recognition software identifies an individual in the group as a dangerous and wanted fugitive. Colored light is overlaid on the individual in order to distinguish the fugitive from other people in the group. As the individual and group move, the overlay remains on the fugitive to facilitate distinguishing the fugitive from the other people in the group, tracking movements of the fugitive, aiming the gun on the fugitive, and firing the gun at the fugitive.

Consider an example in which a shooter practices shooting a weapon at a bullseye target that consists of several concentric circles around a center red dot. The shooter becomes accustomed to firing the weapon at this bullseye target and achieves a high level of accuracy shooting this target. Subsequently, the shooter goes deer hunting and communicates with the weapon and/or weapon targeting system to superimpose an image of the bullseye target on a deer since the shooter is accustomed to shooting the bullseye target and maintains a high level of accuracy on a target in the shape of a bullseye with concentric circles and a center red dot. While hunting, the weapon targets a deer through an electronic scope mounted to the weapon. The electronic scope and/or weapon targeting system identifies the target as a deer and superimposes an image of the bullseye target on the deer such that the center red dot of the bullseye target remains fixed on a kill spot of the deer. The shooter moves and aims the weapon to fire on the bullseye target displayed through the scope. From the point of view of the shooter, the shooter sees and fires the weapon on the bullseye target being displayed through the scope as opposed to the shooter seeing and firing the weapon on the deer being displayed through the scope. The bullseye target can occlude all of the deer or a portion of the deer. Alternatively, the bullseye target is transparent or translucent and positioned to appear on, over, or in front of the deer.

Traditionally, shooters look down a line of sight of a weapon in order to aim the weapon. The shooter fires the weapon at a target when a sighting device (such as an iron sight or an optical sight or telescopic sight) on the weapon aligns with the target. The weapon targeting system of example embodiments can acquire targets, select targets, track targets, aim at targets, and fire on targets with or without the use of a sighting device. For example, instead of aiming the weapon with a sighting device located on the weapon or aiming the weapon down the line of sight, a shooter interacts with visual information presented on a display of an HPED, WEG, or WED that is in communication with the weapon. As another example, a shooter can also interact with visual information presented with or from a sighting device. For instance, the weapon targeting system presents visual information on a display of an electronic scope that is mounted to or attached to the weapon.

Consider an example in which a shooter wears wearable electronic glasses (WEG) that communicate with a camera, image capturing electronics, and/or other electronics on a weapon (such as electronics on a gun or a bow of a bow and arrow). When the weapon targeting system activates, a red dot appears on a display of the WEG and represents an impact location where a projectile fired from the weapon will hit. The red dot tracks and follows in real time movement of the weapon and provides a visual location on the display of the WEG for where or what the projectile will impact. The shooter moves the red dot onto an object in the field of view of the WEG, and selection of this object as the target occurs. For instance, the shooter provides an input to the weapon targeting system to select this object as the target. Alternatively, the weapon targeting system identifies and selects the object as the target and presents this selection to the shooter (such as highlighting the target on the display of the WEG or providing visual indicia on the display to indicate the object is the target). The weapon targeting system retrieves and/or processes information about the target, determines a bullseye location on the target based on this information, and places a bullseye or other visible indicia on the target to show the shooter where to aim and fire the weapon. This bullseye appears on the display of the WEG along with the red dot. The shooter moves the weapon to position the red dot on or over the bullseye location. When the red dot is on, over, or aligns with the bullseye location, the shooter or the weapon targeting system fires the weapon, and the projectile fired from the weapon impacts the target at the bullseye location.

Consider an example in which a shooter wears a wearable electronic device (WED) that communicates with a laser or light emitting device and other electronics on a weapon. The laser follows the line of departure of the projectile from the weapon and represents a theoretical location where the projectile would hit if the projectile traveled in a straight line along the line of departure with no effects from drag, gravity, environmental conditions, etc. The WED and/or weapon targeting system adjusts the location of where the laser impacts an object to take into account drag, gravity, environmental conditions, etc. and uses the location of the laser to calculate an impact location of a projectile fired from the weapon. A display of the WED projects or displays the impact location to the shooter such that the shooter sees on the display where and what the projectile will impact. As the weapon moves from being pointed at a first object to a second object, the impact location on the display simultaneously moves from being located at the first object to being located at the second object. The weapon can therefore be aimed on an object by placing the impact location shown on the display over or on the object also shown on the display. When the weapon is fired, the projectile will strike the object at the location of where impact location is positioned on the object being displayed. A shooter can thus hold, aim, and fire the weapon without actually looking at the target, but looking at the impact location and the target on the display.

Figure 4:
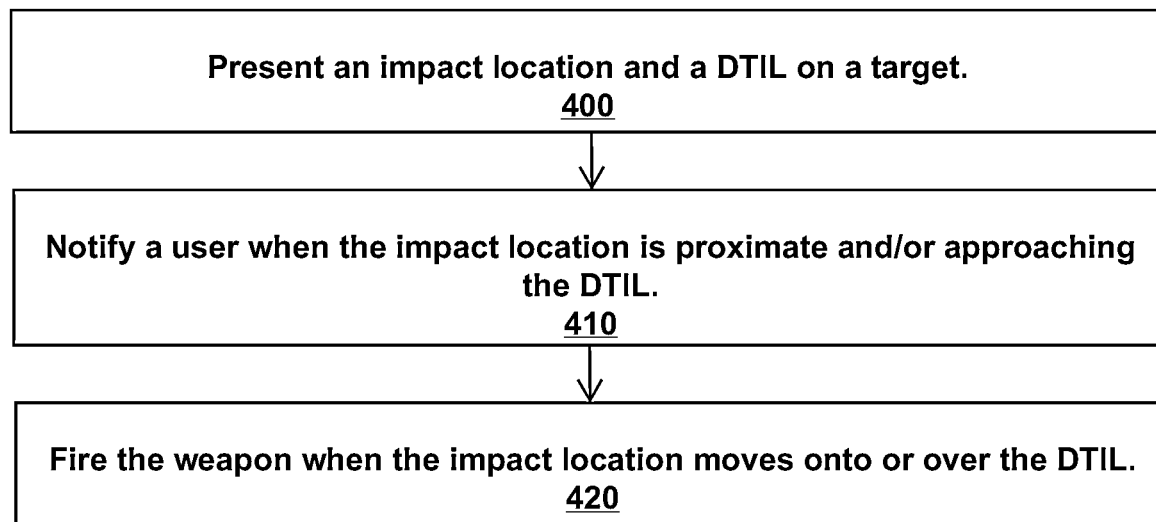
FIG. 4 is a method to fire a weapon for a shooter when an impact location moves onto or over a desired target impact location in accordance with an example embodiment.

FIG. 4 is a method to fire a weapon for a shooter when an impact location moves onto or over a desired target impact location.

Block 400 states present an impact location and a desired target impact location (DTIL) on a target. The impact location represents where a projectile fired from a weapon will impact the target, and the DTIL represents a desired location to hit the target with the projectile.

By way of example, the impact location and the DTIL are displayed on a display, projected or transmitted (e.g. onto the target or another object or location), and/or provided as two or three dimensional images.

Block 410 states notify a user when the impact location is proximate and/or approaching to the DTIL.

The weapon targeting system notifies the user or a shooter when the impact location is near, adjacent, proximate, and/or approaching the DTIL. This notification alerts, warns, or notifies the user or the shooter that the weapon is about to fire automatically. As such, the user or the shooter is not surprised when the weapon discharges the projectile since the weapon targeting system notified the user or the shooter before firing the weapon.

By way of example, notifications to the user or the shooter include, but are not limited to, providing an audible sound, providing indicia on a display, providing a visual cue, providing tactile feedback, and enlarging one or more of the target, the DTIL, and the impact location.

Block 420 states fire the weapon when the impact location moves onto or over the DTIL.

When a shooter pulls a trigger or actuates a firing mechanism to fire a weapon, human jitter can cause the weapon to move unintentionally and to miss the intended point of impact on the target. An example embodiment reduces or eliminates human jitter since the weapon automatically fires for the shooter when the impact location being displayed moves onto, over, or near the bullseye location also being displayed. The shooter is not required to pull a trigger or actuate a firing mechanism to fire the weapon when the impact location aligns with the bullseye location. Instead, the weapon automatically fires when the impact location crosses or passes onto the bullseye location or DTIL.

Consider an example in which a shooter wears a wearable electronic device (WED) with a display that shows an impact location of where a bullet fired from a rifle will impact a moving target and shows a DTIL of a preferred location to strike the target with the bullet. In order to aim the rifle, the shooter is not required to look down the barrel of the rifle, down the line of sight, or through a scope mounted to the rifle. Instead, the shooter aims the weapon by viewing the display of the WED and by moving or pointing the weapon to place the impact location on the DTIL. When the impact location moves onto or near the target but not yet onto the DTIL, the wearable electronic device generates or provides a beeping sound or visual notification to notify the shooter that the impact location approaches the DTIL. When the impact location moves onto the DTIL, the weapon automatically fires the projectile at the target to strike the DTIL.

A user can hold, aim, and fire a weapon without actually looking at the target and/or without actually looking where the weapon is aimed or pointed. Instead, the weapon or another electronic device provides visual information of where the weapon is aimed and provides this information to the user on a display of a portable or handheld electronic device. The display shows a view of where the weapon is aimed (such as field of view or point of aim of the weapon) or what the user would see if the user were aiming the weapon (e.g., what the user would see if the user were looking down the line of sight, looking through a scope mounted to the weapon, aiming the weapon with sights on the weapon, or otherwise aiming the weapon in a traditional manner).

Consider an example in which a weapon includes a camera or image capturing device, and a shooter wears electronic glasses that display real-time video of wear the weapon is aimed (e.g., shows the shooter what the shooter would see if looking down the line of sight and aiming the weapon). The shooter extends the weapon around a corner of a building while keeping his head and body guarded behind a side of the building. The camera on the weapon captures images and provides them to the electronic glasses so the shooter is able to see around the corner of the building without exposing himself. The camera captures an image of a person, and the weapon targeting system identifies the person as an enemy combatant. An image of the person appears on the display and is highlighted or emphasized to show that the person is a target. A desired target impact location appears on the person on the display along with an impact location showing where the weapon is currently aimed. When the shooter moves the weapon such that the impact location coincides or overlaps with the desired target impact location, the image of the person on the display becomes highlighted with color or otherwise emphasized to provide a visual signal to the shooter that the weapon will fire. The shooter is thus able to aim and fire the weapon on a target while remaining behind a corner of a building.

Consider an example in which a rifle includes a camera directed along a line of sight of the rifle to show where the rifle is aimed. Electronic glasses communicate with the rifle, receive real time video from the camera, and display the real time video of where the rifle is aimed. A shooter stands near a wall or tall embankment that is higher than a height of the shooter. The shooter holds the rifle above his head so the camera can see over the embankment or wall. The electronic glasses display enemy combatants several hundred yards away. A weapon targeting system identifies the enemy combatants and calculates DTILs on these combatants. The display of the electronic glasses displays the DTILs and a current impact location showing where the rifle is aimed. When the impact location coincides with a DTIL on the display, the shooter or the weapon targeting system fires the rifle. The shooter was able to aim and fire the rifle while remaining behind cover of the embankment or wall.

Consider an example in which a shooter views a target through an electronic scope that is mounted to a rifle. The electronic scope displays an impact location for bullets fired from the rifle and a DTIL on the target. When the shooter moves the rifle such that the impact location touches the DTIL, the rifle automatically fires.

In an example embodiment, the impact location and/or the DTIL are visible or discernable on the target. For example, the impact location and/or DTIL appear as images or light projected on or transmitted to the target. In another example embodiment, the impact location and/or the DTIL are not visible or discernable on the target. For example, the impact location and/or the DTIL appear on a display of an electronic device but do not otherwise appear, project, or transmit to or on the target itself.

FIGS. 5A-5D show an electronic device 500 with a display 510 displaying a weapon targeting system that includes an impact location 520 and a desired target impact location 530 on a target 540.

Figure 5A:
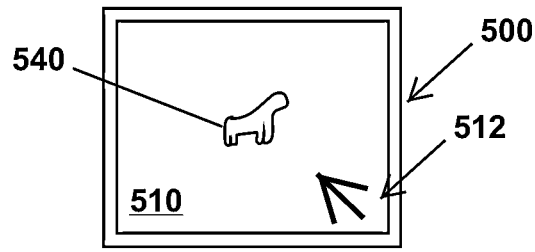
FIG. 5A shows an electronic device with a display that displays a target in accordance with an example embodiment.

FIG. 5A shows the target 540 displayed on the display 510 or seen through the display and/or electronic device. As an example, the electronic device 500 is a HPED, a WED, or a computer in which the target 540 appears as an image on the display of the electronic device. As another example, the electronic device 500 is an electronic scope or WEG in which the target 540 is seen through the electronic device (such as viewing the target through an electronic scope mounted on a weapon or viewing the target through a pair of electronic glasses while a wearer of the electronic glasses looks at the target).

FIG. 5A includes a visual indication or image 512 that provides a direction of where to aim the weapon toward the target. For example, when the impact location is not within a field of view of the user or not currently being displayed (such as not visible or displayed to a user wearing a WED or WEG), then the image 512 appears to assist or to direct the user in finding the target and/or aiming the weapon toward the target. The image includes a direction of where the impact location is located outside of the field of view.

Figure 5B:
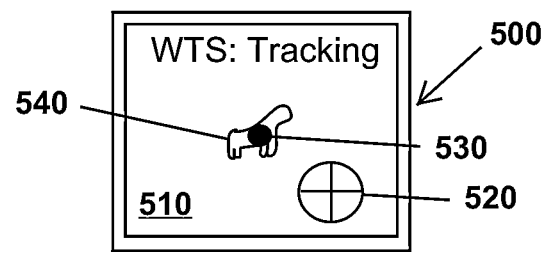
FIG. 5B shows the electronic device in which a weapon targeting system is activated in accordance with an example embodiment.

FIG. 5B shows the weapon targeting system (WTS) activated with the display 510 displaying the impact location 520 and the desired target impact location 530. The display shows "WTS Tracking" and this message signifies that the weapon targeting system is activated and tracking the target 540. The desired target impact location 530 is superimposed on or over the target 540 on the display and shows a desired location to hit the target with a projectile fired from the weapon. The impact location 520 also appears on the display 510 and shows the current, real-time location of where the projectile with strike if fired from the weapon. As shown, the impact location 520 is not aligned with the desired target impact location 530. As such, if the weapon were fired, the projectile would miss the target 540 but strike a location at the cross-hairs, reticles, or center "X" of the impact location 520.

The impact location 520 and the desired target impact location 530 are visible to a user or wearer of the electronic device 500 since these locations appear on the display 510. These locations may or may not be visible to other persons as well. For example, the locations are transmitted to another electronic device that displays the locations and field of view of the user on a display to another person. As another example, an electronic device transmits light onto the target such that the locations physically appear on the target and can be viewed with the naked eye or with assistance from an electronic device.

Figure 5C:
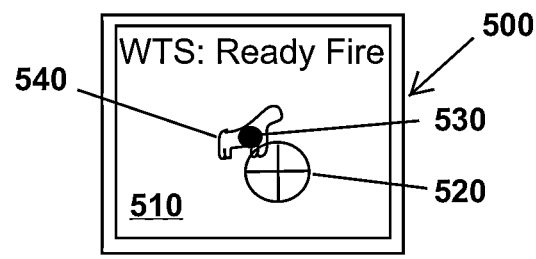
FIG. 5C shows the electronic device in which the weapon targeting system provides a notification or alert that an impact location moves within proximity of the target in accordance with an example embodiment.

As shown in FIG. 5C, when the impact location 520 moves within proximity of the target 540, the weapon targeting system provides a notification or alert. By way of example, this notification or alert can signify that the weapon is ready to fire, the weapon is about to fire or will fire in the immediate future, the impact location is aligned or almost aligned with the desired target impact location, firing can commence, non-lethal firing can commence (e.g., when the cross-hairs are on or near the target but not on the desired target impact location), lethal firing can commence (e.g., when the cross-hairs are on the desired target impact location).

The notification or alert include, but is not limited to one or more of, an audible sound (e.g., a beep or other sound provided to a user), a visual message or visible indication (e.g., indicia or words appearing on the display, change to or addition of color, contrast, background, light, etc.), and tactile feedback (e.g., a vibration). By way of example, FIG. 5C shows a visual notification of the displaying presenting the words "WTS: Ready Fire" and a change in color or brightness of the impact location. For instance, the impact location changes to the color red (shown in FIG. 5C with the impact location 520 having a darker shade).

Figure 5D:
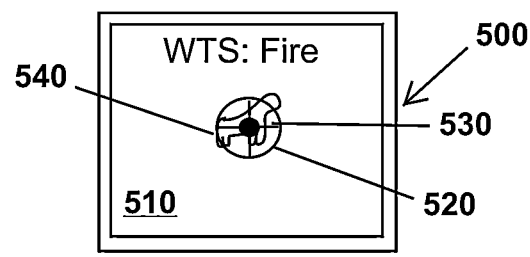
FIG. 5D shows the electronic device in which the impact location aligns on a desired target impact location in accordance with an example embodiment.

FIG. 5D shows the impact location 520 aligned on the desired target impact location 530. Firing of the weapon at this moment will cause the projectile to strike the target at the desired target impact location 530. By way of example, the display 510 displays "WTS: Fire" to signify the weapon is being fired.

By way of example, the alert or notification can occur when the impact location is near or proximate the DTIL, approaches the DTIL, is on or over the DTIL, aligns with the DTIL, etc. Alternatively, the alert or notification can occur when the weapon is about to fire or is firing.

Consider an example in which a weapon targeting system tracks a target with a DTIL. A weapon moves to aim and fire on the target. When an impact location of a projectile from the weapon is on the target but not yet on the DTIL, the weapon targeting system provides the alert or notification. Alternatively, the weapon targeting system provides the alert or notification when firing is imminent or when the weapon will fire within is certain time period (e.g., fire within the next one second or within the next two seconds or within the next three seconds, etc.).

Figure 6:
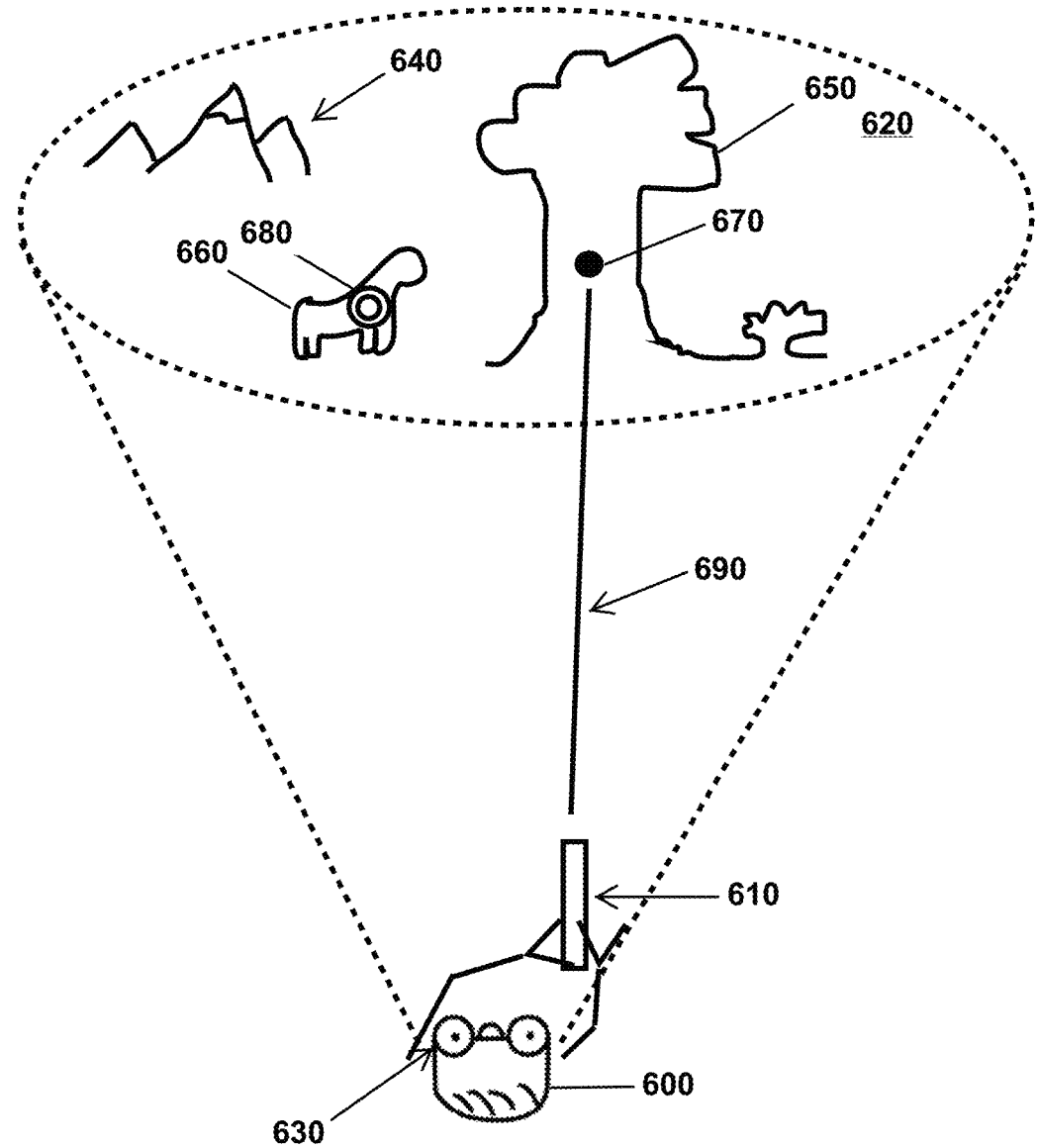
FIG. 6 shows a user interacting with a weapon targeting system to aim a weapon with visual information presented in a field of view on or through a pair of wearable electronic glasses in accordance with an example embodiment.

FIG. 6 shows a user 600 interacting with a weapon targeting system to aim a weapon 610 with visual information presented in a field of view or field of vision 620 on or through a pair of wearable electronic glasses (WEG) 630. By way of example, the field of view 620 includes mountains 640, a tree 650, and a target 660 with the weapon being aimed at the tree 650. The WEG 630 displays an impact location 670 that appears to the user be located on the tree 650 where the weapon 610 is aimed and also displays a desired target impact location 680 that appears to the user be located on the target 660. In order to fire on the target 660, the user 600 would move the weapon 610 toward the target until the impact location 670 displayed on the WEG 630 coincides with or overlaps on the desired target impact location 680.

In a traditional aiming position, for example, a user holds the rifle in a "natural point of aim" and aligns the rifle sights on the target with his or her eye while looking down the line of sight of the weapon. In an example embodiment, the weapon targeting system enables a user to aim and to fire the weapon at a precise and desired location on a target without the user looking down the line of sight or without the user holding the weapon in a traditional aiming position.

FIG. 6 shows the weapon 610 held to a right side of the user 600 (such as the user holding the weapon at his or her waist) while the user looks at the target 660 through the WEG 630. Here, the user is free to move his or her head away from the line of sight of the weapon since the user sees the target 660, the desired target impact location 680, and the impact location 670 while looking through the WEG 630. The user is not required to focus his or her eyes on the sights of the weapon (such as iron sights or reticles in a scope), but instead can focus on objects in the field of view while aiming and firing the weapon on the target.

In addition to displaying the impact location 670 and the desired target impact location 680, the WEG 630 can also display a trajectory path 690 of the projectile before, during, or after the projectile is fired from the weapon 610. The trajectory path or flight path of the projectile is the path that the projectile follows through space after being fired from the weapon.

A visual view of the trajectory path can assist the user in aiming the weapon and determining whether or not to fire upon the target. For example, in some situations, it may be difficult for the user to spot or see the impact location (e.g., when the impact location is a far distance from the user, when the weapon is not pointed at an object or pointed into air or space, when the impact location is not in the field of view of the user, when the weapon is pointed behind the user, etc.). In these instances, the trajectory path shows where the weapon is pointed and also shows the flight path of the projectile even though the user may not be able to see the actual impact location. In other situations, a user may desire to see a trajectory path of the projectile before the projectile is fired from the weapon. The trajectory path, for example, may show that the projectile will hit or near miss an unintended object that is not the target.

Consider an example in which a shooter wears electronic night vision goggles that communicate with a weapon targeting system while aiming a weapon at a target. Due to distance from the target and poor lighting conditions, the shooter is not able to see an impact location on the target. The goggles, however, display to the user a forecasted or projected trajectory path of a projectile fired from the weapon. This trajectory path shows the path of the projectile from the weapon to the impact location on the target. Light illuminates the trajectory path on a display of the goggles so the user can determine whether to fire the weapon.

Consider an example in which a user aims a rifle with an electronic scope at a target located in a wooded area. The electronic scope predicts a trajectory path of a bullet fired from the weapon based on the current aim of the rifle and displays this trajectory path to the user in the electronic scope. This trajectory path show that a bullet fired from the rifle at its current position will travel near or through numerous branches in a tree in the wooded area.

FIGS. 7A-7D show an electronic device 700 having a display 710 that displays a target augmented with an image.

Figure 7A:
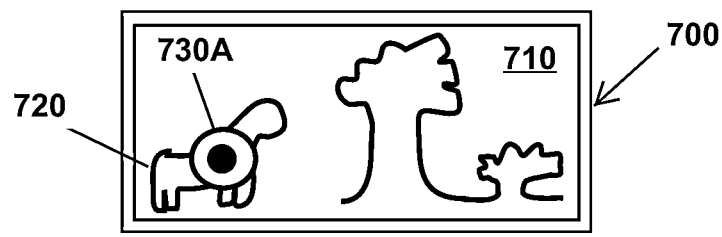
FIG. 7A shows an electronic device with a display that displays a target with an image displayed on or over the target in accordance with an example embodiment.

FIG. 7A shows the target 720 with an image 730A displayed on or over the target 720. By way of example, the image 730A is a bullseye location or a desired target impact location on the target 720. The image 730A overlays on or augments the target 720 and/or occludes or blocks a portion of the target 720.

Figure 7B:
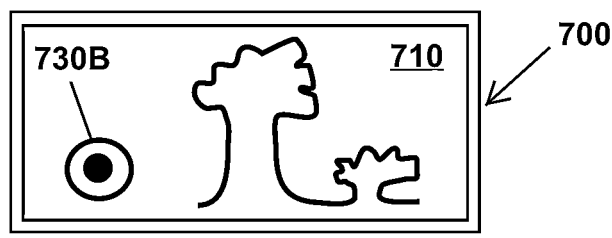
FIG. 7B shows the electronic device with the image displayed on or over the target such that the target is not visible on the display in accordance with an example embodiment.

FIG. 7B shows an image 730B displayed on or over the target such that the target is not visible on the display 710. By way of example, the image 730B is a bullseye location or a desired target impact location that overlays on or augments the target and/or occludes or blocks a view of the target. For instance, the target is removed, covered, or hidden such that the shooter sees the image 730B without seeing the target.

Figure 7C:
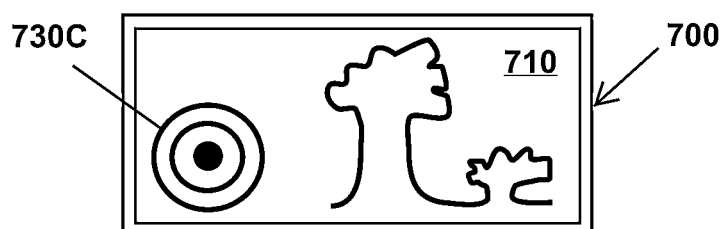
FIG. 7C shows the electronic device with an enlarged image displayed on or over the target such that the target is not visible on the display in accordance with an example embodiment.

FIG. 7C shows an enlarged image 730C displayed on or over the target such that the target is not visible on the display 710. By way of example, the enlarged image 730C is a bullseye location or a desired target impact location that overlays on or augments the target and/or occludes or blocks a view of the target. For instance, the target is removed, replaced, covered, or hidden such that the shooter sees the image 730C without seeing the target.

Figure 7D:
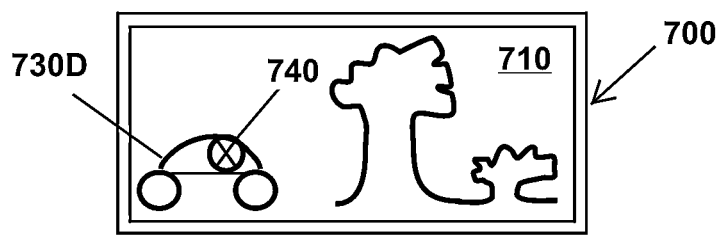
FIG. 7D shows the electronic device with an image displayed on or over the target such that the target is not visible on the display in accordance with an example embodiment.

FIG. 7D shows an image 730D displayed on or over the target such that the target is not visible on the display 710. By way of example, the image 730D is an automobile with a bullseye location or a desired target impact location 740 that overlays on or augments the target and/or occludes or blocks a view of the target. For instance, the target is removed, replaced, covered, or hidden such that the shooter sees the image 730D without seeing the target.

In FIG. 7B-7D, objects in the field of view of the user are visible to the user except for the target. Thus, even though the target is physically in the field of view of the user, this target is not visible to the user since the image 730B, 730C, and 730D blocks or occludes the view of the target. The image is a visual substitute for the target. In other words, instead of seeing the target in the field of view, the user sees the image that appears at a same location where the target is physically located. The image can have a same size and shape as the target or have a different size and shape of the target.

In an example embodiment, the target being displayed on the display or seen through the display is replaced with an image that includes or is an image of the bullseye location such that the target is not visible on or through the display but is replaced with the image. The image and the target can also be viewed together (e.g., the image being transparent or translucent).

Consider an example in which a hunter hunts deer at dusk with poor or fading lighting conditions. The hunter sees a deer several hundred meters away through an electronic scope mounted to a rifle. Due to the distance and lighting conditions, the deer is not fully or clearly visible through the electronic scope. A weapon targeting system provides an animated image on or over a location of the deer in the electronic scope so the hunter can clearly see the deer through the electronic scope. By way of example, the animated image replaces the deer and appears brighter or more discernable in the electronic scope. As another example, the animated image augments the deer and provides a highlighted outline or visible lines around or within a perimeter or external outline of a body of the deer. The lines follow a contour of the body of the deer and/or fill the deer in order to exaggerate, emphasize, and/or highlight the physical location and boundary of the deer.

Consider an example in which a soldier wears WEG while targeting a vehicle at night with a weapon. The vehicle is not readily discernable with a naked eye of the soldier due to distance of the vehicle and darkness. A weapon targeting system determines a location of the vehicle with infrared sensors and presents an animated or augmented image of the vehicle on the display of the WEG. This animated or augmented image on the display includes bright lines that trace or sketch what the vehicle looks like at its current location. Since the lines are clearly visible through the WEG, the soldier can aim and fire the weapon on the vehicle.

Consider an example in which a shooter is game hunting and prefers to aim and fire on a square haystack instead of the animal being hunted. The weapon targeting system detects and tracks the animal target and superimposes a square haystack over the animal such that the shooter sees the square haystack instead of the animal. The square haystack simultaneously moves in unison with and in real-time with the animal. A bullseye location shown on the square haystack coincides with a bullseye location on the animal. As such, when the shooter aims and fires the weapon on the bullseye location of the haystack, the projectile fired from the weapon hits the bullseye location on the animal. For instance, if the game target were a deer, the bullseye location would correspond with a location that would kill the deer.

Figure 8A:
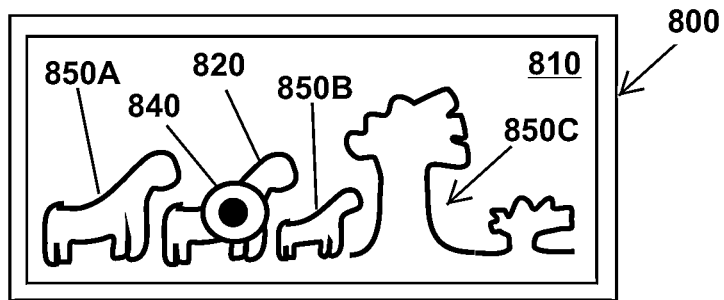
FIG. 8A shows an electronic device with a display that displays a target with an image shown as a bullseye location or a desired target impact location that appears on or over the target in accordance with an example embodiment.
Figure 8B:
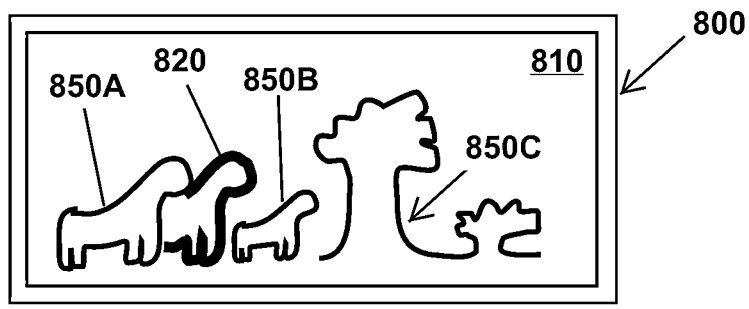
FIG. 8B shows the electronic device with the target with the image removed since an object obstructs the target or otherwise interferes with safely firing on the target with a weapon in accordance with an example embodiment.
Figure 8C:
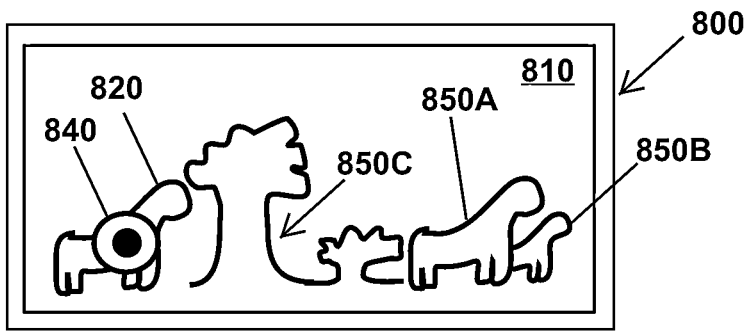
FIG. 8C shows the electronic device with the target with the image repositioned or replaced back on the target since the object no longer obstructs the target or otherwise interferes with safely firing on the target with the weapon in accordance with an example embodiment.

FIGS. 8A-8C show an electronic device 800 having a display 810 that displays a target 820 augmented with an image.

FIG. 8A shows the target 820 with an image 840 shown as a bullseye location or a desired target impact location that appears on or over the target 820. Other objects 850A, 850B, and 850C surround the target or are proximate to the target. These objects, however, do not obstruct the target or otherwise interfere with safely firing on the target with the weapon. The image 840 is fully displayed and visible, and a weapon can safely fire on the target without hitting other objects or risking collateral damage.

FIG. 8B shows the target 820 with the image removed since the object 850A obstructs the target or otherwise interferes with safely firing on the target with the weapon. Removal of the image signifies to the shooter that it is not desirable or not safe to fire on the target. The target 820 is augmented, highlighted, or distinguished so the shooter can visually track the target while the image is removed. By way of example, an outer perimeter of the target is highlighted with visible lines on the display (shown with a darker or thicker line) to enable the shooter to see and follow the target while object 850A partially obstructs, hides, or hinders firing on the target.

FIG. 8C shows the target 820 with the image 840 repositioned or replaced back on the target since the object 850A no longer obstructs the target or otherwise interferes with safely firing on the target with the weapon. Replacement of the image back onto the target signifies to the shooter that it is desirable or safe to fire the weapon on the target. A projectile fired from the weapon has an unobstructed trajectory path to the target.

Figure 9:
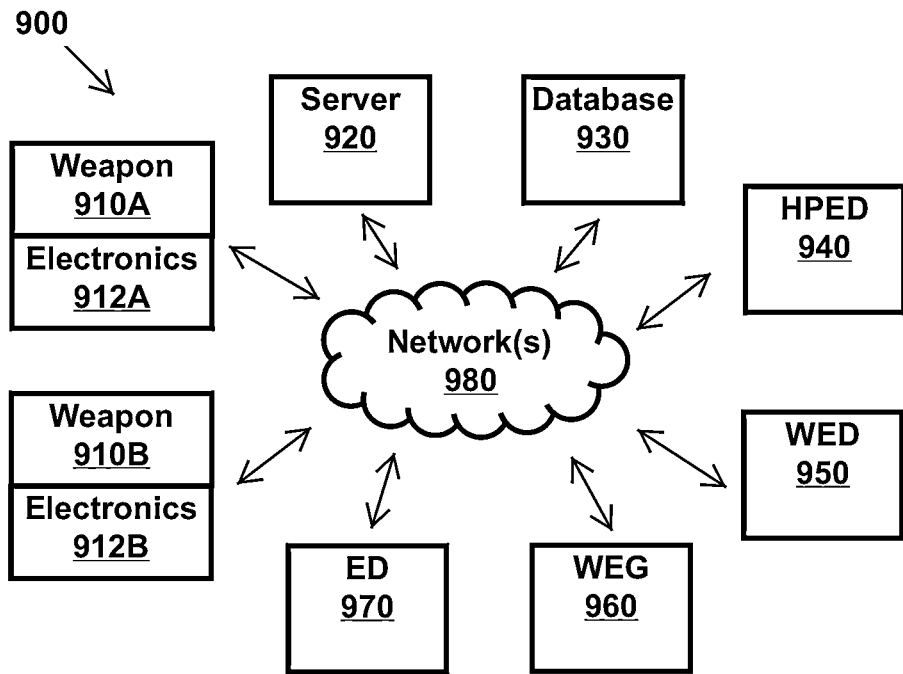
FIG. 9 is a weapon targeting system in accordance with an example embodiment.

FIG. 9 is a weapon targeting system 900 that includes one or more of the following: weapons 910A and 910B with an electronic device or electronics 912A and 912B, a server 920, a database 930 or other storage, a handheld portable electronic device or HPED 940, a wearable electronic device or WED 950, wearable electronic glasses or WEG 960, an electronic device 970 (such as a computer, an electronic scope, camera, a weapon, an arrow, a projectile, or other electronic device), and one or more networks 980 through which electronic devices can communicate (such as wirelessly communicate).

Figure 10:
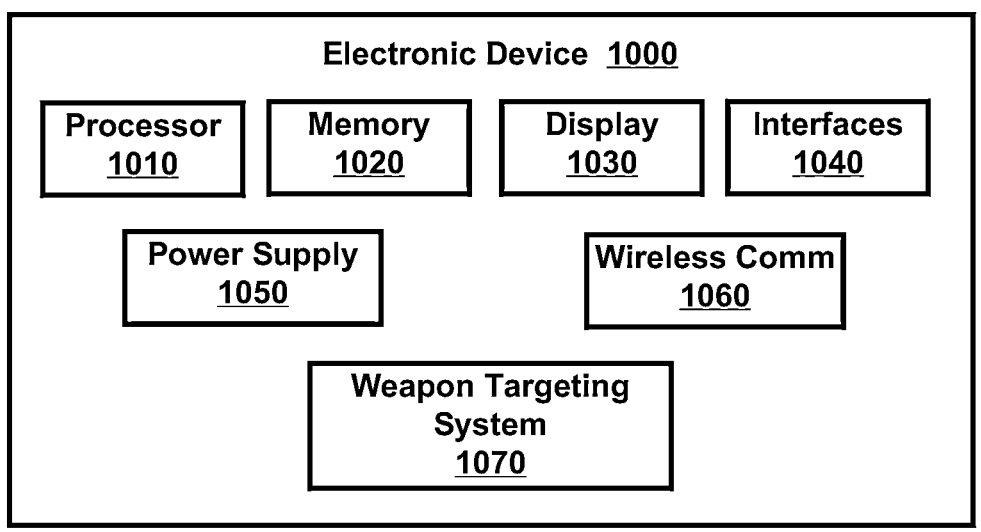
FIG. 10 is an electronic device in accordance with an example embodiment.

FIG. 10 is an electronic device 1000 that includes one or more of the following: a processing unit or processor 1010, a computer readable medium (CRM) or memory 1020, a display 1030, one or more interfaces 1040 (such as a network interface, a graphical user interface, a natural language user interface, and/or an interface that combines reality and virtuality), a battery or a power supply 1050, wireless communication 1060, and a weapon targeting system 1070 (such as a system that executes one or more example embodiments discussed herein).

Figure 11:
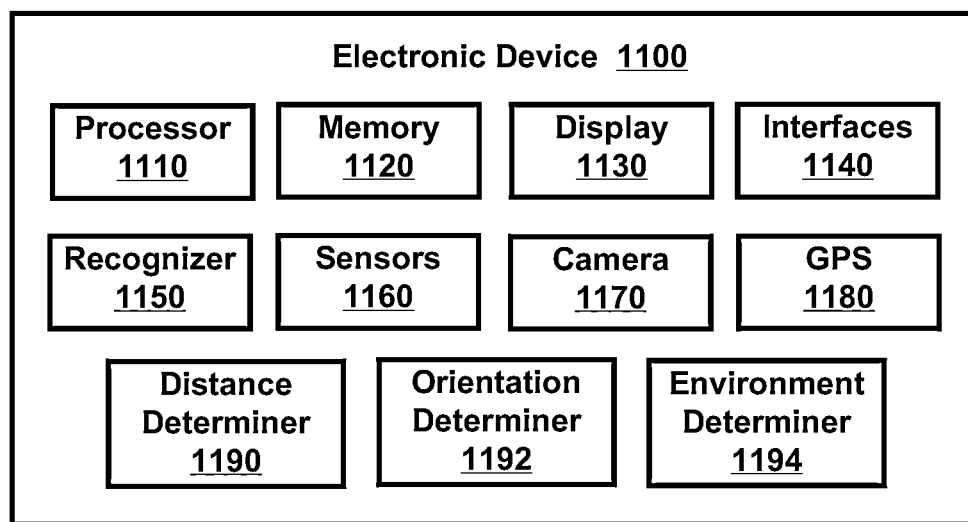
FIG. 11 is another electronic device in accordance with an example embodiment.

FIG. 11 is an electronic device 1100 that includes one or more of the following: a processing unit or processor 1110, a computer readable medium (CRM) or memory 1120, a display 1130, one or more interfaces 1140 (such as a network interface, a graphical user interface, a natural language user interface, and/or an interface that combines reality and virtuality), one or more recognizers 1150 (such as object recognition software, facial recognition software, and/or animal recognition software), one or more sensors 1160 (such as micro-electro-mechanical systems sensor, a motion sensor, an optical sensor, radio-frequency identification sensor, a global positioning satellite sensor, a solid state compass, gyroscope, an accelerometer, a draw length sensor for a string on a bow, and/or a weather sensor), a camera 1170, a global positioning system or GPS 1180, a distance determiner 1190 (such as a laser, a rangefinder, a camera, and/or a camera), an orientation determiner 1192 (such as a tilt sensor, inclinometer, and/or an accelerometer), and an environmental determiner 1194 (such as a thermometer, a barometer, a humidity sensor, a wind vane, an anemometer, a compass, and/or software to obtain weather or environmental conditions data).

FIGS. 10 and 11 show various components in a single electronic device. One or more of these components can be distributed or included in various electronic devices, such as some components being included in an HPED, some components being included in a server, some components being included in storage accessible over the Internet, some components being in wearable electronic devices or a weapon or projectile, and some components being in various different electronic devices that are spread across a network, a cloud, and/or a weapon targeting system.

The processing unit or processor (such as a central processing unit, CPU, microprocessor, application-specific integrated circuit (ASIC), etc.) controls the overall operation of memory (such as random access memory (RAM) for temporary data storage, read only memory (ROM) for permanent data storage, and firmware). The processing unit or processor communicates with memory and performs operations and tasks that implement one or more blocks of the flow diagrams discussed herein. The memory, for example, stores applications, data, programs, algorithms (including software to implement or assist in implementing example embodiments) and other data.

One or more aspects of the weapon target system can be included with the arrow, such as an arrow described in United States patent application entitled "Arrow with Electronic Device" and having Ser. No. 14/185,878, which is incorporated herein by reference.

Blocks and/or methods discussed herein can be executed and/or made by a user, a user agent of a user, a software application, an electronic device, a computer, and/or a computer system.

As used herein, "bullseye location" is a center of a target, a kill location of a living target, or a desired location to hit a target with a projectile fired from a weapon. For example, a bullseye location can be a central or center area of a target. As another example, a bullseye location can be an intended or desired location or area on a target (such as a designated spot or location on an animal, a human, or an object). The bullseye location is not restricted to being designated with a certain type of indicia, visual identification, and/or audio identification.

As used herein, "drag" is a retarding force on a projectile caused by air resistance.

As used herein, a "desired target impact location" or "DTIL" is a desired location to hit a target with a projectile fired from a weapon.

As used herein, "drift" is a deviation from a path of flight of a projectile due to rotation or spin of the projectile. Drift can also be applied to affects from wind.

As used herein, "drop" is a distance that a projectile falls from the line of departure to the ballistic trajectory at a given distance.

As used herein, "field of view" or "field of vision" is the extent of the observable world that is seen or captured at a given moment. For example, without mechanical assistance, humans have almost one hundred and eighty (180) degrees of forward-facing field of view with about one hundred and twenty (120) degrees of this field being binocular vision.

As used herein, "impact location" is a location where a projectile fired from a weapon impacts an object.

As used herein, the "line of departure" is a straight line that extends from a centerline or an axis of a bore of a gun or along a mounted arrow in a bow.

As used herein, the "line of sight" is a straight line that extends from the scope or other sighting apparatus to the point of aim.

As used herein, the "line of trajectory" or the "ballistic trajectory" is the line or flight path that a projectile follows while in flight.

As used herein, a "weapon" includes firearms (such as portable guns), archery (such as bow and arrows), light weapons, heavy weapons, and other weapons that launch, fire, or release a projectile.

As used herein, a "wearable electronic device" is a portable electronic device that is worn on or attached to a person. Examples of such devices include, but are not limited to, electronic watches, electronic necklaces, electronic clothing, head-mounted displays, electronic eyeglasses or eye wear (such as glasses in which an image is projected through, shown on, or reflected off a surface), electronic contact lenses, an eyetap, handheld displays that affix to a hand or wrist or arm, and HPEDs that attach to or affix to a person.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method, comprising:
wirelessly receiving, at a head mounted display (HMD) worn on a head of a user with a rifle, video of a person captured with a camera mounted to the rifle;
displaying, with a display of the HMD worn on the head of the user, the video of the person and crosshairs that show a point of aim of the rifle; and
accentuating the person being displayed by displaying, with the display of the HMD worn on the head of the user, a virtual image over the person in order to highlight the person in the video captured with the camera mounted to the rifle,
wherein the virtual image over the person includes virtual lines around a perimeter of the person, and the HMD displays the virtual image while also displaying the crosshairs over the person.

2. The method of claim 1, wherein the virtual image is superimposed over the person and has a size and a shape of the person being displayed on the display of the HMD.

3. The method of claim 1, wherein the virtual image is an augmented reality (AR) image that has a size and a shape of the person that appears on the display.

4. The method of claim 1 further comprising:
simultaneously displaying, with the display of the HMD, the crosshairs that show the point of aim of the rifle and a desired target impact location (DTIL) on the person that shows a desired location where to hit the person with a bullet fired from the rifle.

5. The method of claim 1 further comprising:
automatically firing the rifle when the crosshairs displayed on the display of the HMD align with a desired target impact location (DTIL) that is a desired location where to hit the person with a bullet fired from the rifle.

6. The method of claim 1, wherein the virtual image over the person highlights, with at least one of color or light, the perimeter of the person to enhance a view of the person seen with the display of the HMD.

7. The method of claim 1 further comprising:
moving, on the display of the HMD, the virtual image so that the virtual image remains over the person being displayed on the display as the person moves.

8. The method of claim 1 further comprising:
sensing, with one or more sensors, an orientation of the rifle; and
deactivating a weapon targeting system (WTS) shown on the display in response to sensing that the orientation of the rifle is point to ground.

9. A head mounted display (HMD) worn on a head of a user with a rifle, the HMD comprising:
an interface that wirelessly receives, from an electronic scope mounted to the rifle, an image of a person captured with a camera of the electronic scope when a point of aim of the rifle is directed at the person; and
a display that simultaneously displays crosshairs that show the point of aim of the rifle and displays an augmented reality (AR) image over the image of the person being displayed to enhance the person being displayed, wherein the AR image displayed over the image accentuates the person that is at least partially occluded.

10. The HMD of claim 9, wherein the AR image has a size and a shape of the image of the person being displayed.

11. The HMD of claim 9, wherein the display simultaneously displays the crosshairs, the AR image over the image of the person, and a desired target impact location (DTIL) on the person that shows a desired location where to hit the person with a bullet fired from the rifle.

12. The HMD of claim 9, wherein the display simultaneously displays the crosshairs and a desired target impact location (DTIL) on the person that shows a desired location where to hit the person with a bullet fired from the rifle, and wherein the DTIL on the person moves with real-time movements of the person such that the DTIL remains on the person as the person moves.

13. The HMD of claim 9 further comprising:
a memory that stores code of a weapon targeting system; and
a processor that executes code of the weapon targeting system that displays on the display, wherein the HMD deactivates the weapon targeting system in response to detecting an orientation of the rifle is pointed to ground.

14. The HMD of claim 9, wherein the AR image highlights an infrared image of the person with color to enhance the person being displayed.

15. A head mounted display (HMD) worn on a head of a user with a rifle, comprising:
an interface that wirelessly receives, from an electronic scope mounted to the rifle, video of the point of aim of the rifle directed to a target; and
a display that simultaneously displays, on the video, crosshairs that show the point of aim of the rifle and a desired target impact location (DTIL) on the target that shows a desired location where to hit the target with a bullet fired from the rifle, wherein the DTIL is different from the crosshairs and is the desired location where to hit the target with the bullet fired from the rifle.

16. The HMD of claim 15, wherein the display superimposes a virtual image on the target to enhance an infrared image of the target.

17. The HMD of claim 15, wherein the display enhances a view of the target by displaying a virtual image over the target, and the virtual image over the target on the display has a size and a shape of the target.

18. The HMD of claim 15, wherein movements of the DTIL coincide with real-time movements of the target such that the DTIL remains on the target as the target moves.

19. The HMD of claim 15, wherein the HMD accentuates the target being displayed by superimposing virtual lines around a perimeter of the target.

* * * * *